United States Patent
McCoy et al.

(10) Patent No.: US 11,199,652 B2
(45) Date of Patent: Dec. 14, 2021

(54) ACTIVE PRIVACY SCREEN

(71) Applicant: Sony Interactive Entertainment Inc., Tokyo (JP)

(72) Inventors: Charles McCoy, San Mateo, CA (US); True Xiong, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/784,932

(22) Filed: Feb. 7, 2020

(65) Prior Publication Data

US 2021/0247552 A1    Aug. 12, 2021

(51) Int. Cl.
| | |
|---|---|
| G09G 3/00 | (2006.01) |
| G06F 3/01 | (2006.01) |
| G02B 5/00 | (2006.01) |
| G06K 9/00 | (2006.01) |
| G06T 7/70 | (2017.01) |
| G08B 7/06 | (2006.01) |

(52) U.S. Cl.
CPC ......... *G02B 5/003* (2013.01); *G06K 9/00362* (2013.01); *G06T 7/70* (2017.01); *G08B 7/06* (2013.01); *G09G 3/007* (2013.01); *G02B 2207/123* (2013.01); *G06F 3/012* (2013.01); *G06F 3/013* (2013.01); *G06T 2207/30196* (2013.01); *G09G 2320/068* (2013.01); *G09G 2354/00* (2013.01); *G09G 2358/00* (2013.01)

(58) Field of Classification Search
CPC ... G02B 2207/123; G06F 3/012; G06F 3/013; G06K 9/00362; G06T 7/70; G06T 2207/30196; G08B 7/06; G09G 3/007; G09G 2320/068; G09G 2354/00; G09G 2358/00

See application file for complete search history.

(56) References Cited

U.S. PATENT DOCUMENTS

| | | | | |
|---|---|---|---|---|
| 3,552,295 | A * | 1/1971 | Armstrong | F24F 13/15 454/315 |
| 4,209,926 | A * | 7/1980 | Ueki | G09F 11/025 40/437 |
| 4,812,709 | A * | 3/1989 | Dudasik | H01J 29/89 313/478 |
| 4,814,759 | A * | 3/1989 | Gombrich | G06F 1/1601 345/60 |
| 5,856,857 | A * | 1/1999 | Kim | G02F 1/133753 349/129 |
| 5,856,877 | A * | 1/1999 | Burger | G06K 9/00463 358/448 |
| 6,765,550 | B2 * | 7/2004 | Janick | G02B 5/00 345/87 |
| 8,538,462 | B2 * | 9/2013 | Forstall | H04L 67/18 455/456.3 |

(Continued)

OTHER PUBLICATIONS

International Search Report and Written Opinion dated Mar. 11, 2021 from the counterpart PCT application PCT/US21/015079.

*Primary Examiner* — Mihir K Rayan
(74) *Attorney, Agent, or Firm* — John L. Rogitz (57) ABSTRACT

An assembly juxtaposed with a computer display has rows and columns of movable louvers that move as the user's head moves to permit light from the display to reach the user's eyes but to screen light from the display in other directions, to reduce the risk of eavesdropping.

12 Claims, 6 Drawing Sheets

(56) References Cited

U.S. PATENT DOCUMENTS

| | | | |
|---|---|---|---|
| 2006/0119575 A1* | 6/2006 | Richardson | G09B 9/302 345/156 |
| 2008/0303781 A1* | 12/2008 | Teijido | G09G 3/34 345/109 |
| 2009/0242142 A1* | 10/2009 | Bellwood | G02B 19/0019 160/127 |
| 2010/0091207 A1* | 4/2010 | Hasegawa | G09G 3/3233 349/15 |
| 2011/0043882 A1* | 2/2011 | Yoon | G02B 26/0841 359/230 |
| 2011/0203745 A1* | 8/2011 | Abreu | E06B 7/082 160/178.1 R |
| 2013/0021240 A1* | 1/2013 | Coulon | G06F 21/6245 345/156 |
| 2014/0110040 A1* | 4/2014 | Cok | G02B 5/3058 156/182 |
| 2015/0124063 A1* | 5/2015 | Woods | H04N 13/117 348/56 |
| 2017/0116425 A1* | 4/2017 | Chang | G02B 5/3016 |
| 2018/0252949 A1* | 9/2018 | Klippstein | G02F 1/13476 |
| 2019/0163020 A1* | 5/2019 | Ikeno | G02F 1/167 |

* cited by examiner

ACTIVE PRIVACY SCREEN

FIELD

The application relates to active privacy screens.

BACKGROUND

People commonly view their device screens in public places and as a consequence, what they are viewing may also be seen by others.

SUMMARY

To prevent this, a privacy screen is provided for displays that actively adapts to the viewer's location. Such a narrower field of view provides more security against nearby people looking at the screen, even if their line of sight is close to the viewer's head. As the viewer moves his head in relation to the screen, the angle in which the privacy screen allows light to pass changes to match the new angle to the viewer's eyes. In this way the viewer does not perceive the image to fade as the viewer moves his head, while minimizing the chance that another person behind the viewer might see the image when the viewer's head is no longer blocking light from the display. Present principles are useful for times when a screen is displaying something that is only meant for the viewer, such as a business traveler working on a laptop computer, a commuter on a train reading private messages on their phone, or a security agent viewing a screen showing carry-on luggage screening images.

Accordingly, an apparatus includes at least one device screen and at least one blocking assembly juxtaposed with the screen and including at least one movable louvre configured to move to at least partially block the screen.

In example embodiments, the blocking assembly includes plural louvers. A first set of the louvers can be oriented perpendicular to a second set of the louvers. One or more louvers may be configured to tilt about an edge of the louver. The first set of louvers may be disposed in a first level and the second set of louvers may be disposed in a second level.

The louver can be positioned in front of the device screen. Or, the louver can be manufactured as part of the device screen.

In some implementations, louvers in the first set of louvers have a first length and louvers in the second set of louvers have a second length different from the first length. In examples, plural louvers that move in concert with each other. In other examples, plural louvers move independently of each other.

In an example embodiment a louver may include an upper panel and a lower panel parallel to the upper panel and slidably movable relative thereto.

In another aspect, a consumer electronics (CE) device includes at least one display screen, at least one camera, at least one louver assembly juxtaposed with the display screen, and at least one processor configured with instructions executable to present demanded images on the display screen. The instructions are further executable to move at least a first louver in the louver assembly at least in part based on at least one image from the camera.

In example embodiments the instructions can be executable to execute image recognition on the at least one image to identify a location of a user and move at least the first louver based on the location. The instructions may be executable to, based at least in part on the image recognition, activate at least one alarm indicating an eavesdropper. Example instructions further can be executable to, based at least in part on the image recognition, deenergize the display screen.

If desired, the instructions can be executable to actuate the louver assembly to direct a field of view (FOV) of light propagating away from the display screen at the location of the user.

In some implementations the instructions are executable to present at least one user interface (UI) configured to enable a user to enable and disable movement of the louver assembly.

In another aspect, a consumer electronics (CE) device includes at least one display screen and at least one louver assembly juxtaposed with the display screen with louvers that bound each of plural edges of at least a first pixel region of the display screen containing a first pixel. At least the first pixel of the first pixel region is movable relative to the louvers, or the louvers are movable relative to the first pixel, or both the first pixel and louvers are movable.

The details of the present application, both as to its structure and operation, can best be understood in reference to the accompanying drawings, in which like reference numerals refer to like parts, and in which:

DETAILED DESCRIPTION

This disclosure relates generally to aspects of consumer electronics (CE) devices with viewable display screens. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
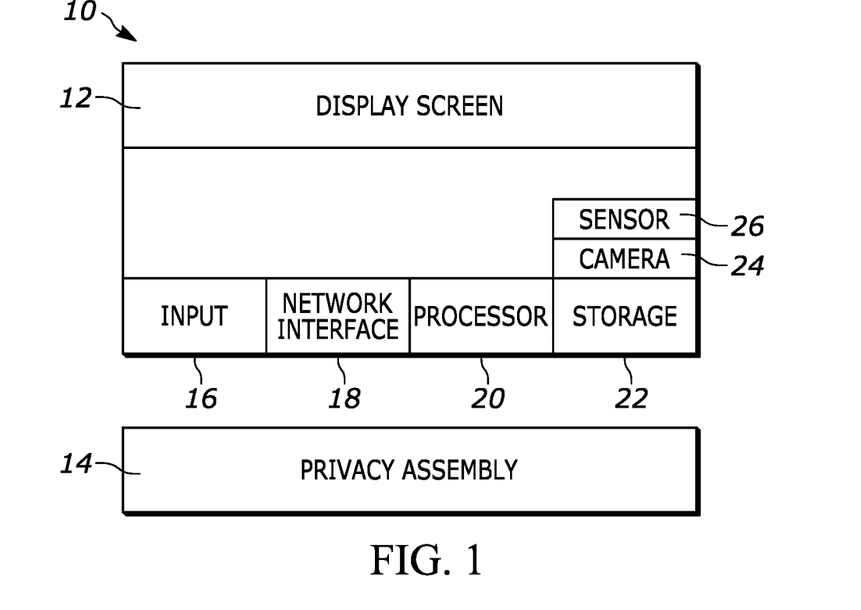
FIG. 1 is a block diagram of an example system including an example in accordance with present principles.

Now specifically referring to FIG. 1, an example CE device 10 includes a display screen 12 (referred to herein as a "display" or a "screen" or a "display screen") in an exploded relationship with a privacy assembly 14 which is described further herein to partially cover the screen 12 to afford privacy.

The example CE device 10 may be implemented by any appropriate computing device such as but not limited to an Internet-enabled TV, a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, etc.

The screen 12 may be implemented by a high definition or ultra-high definition "4K" or higher flat screen and that may be touch-enabled for receiving user input signals via touches on the display or by another video display or computer display. The CE device 10 may include at least one input device 16 such as a mouse, keyboard, keypad, or microphone for entering audible commands. The CE device 10 may also include one or more network interfaces 18 for communication over at least one network under control of one or more processors 20. The interface 18 include one or more of a Wi-Fi transceiver, which is an example of a wireless computer network interface, such as but not limited to a mesh network transceiver, or a Bluetooth® transceiver, or a wireless telephony transceiver, etc. The CE device 10 may further include one or more computer memories 22 such as disk-based or solid-state storage that are not transitory signals.

Continuing the description, the CE device 10 may include one or more cameras 24 that may be, e.g., a thermal imaging camera, a digital camera such as a webcam, and/or a camera controllable by the processor 20 to gather pictures/images and/or video in accordance with present principles.

The CE device 10 may include one or more auxiliary sensors 26 such as a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 20.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
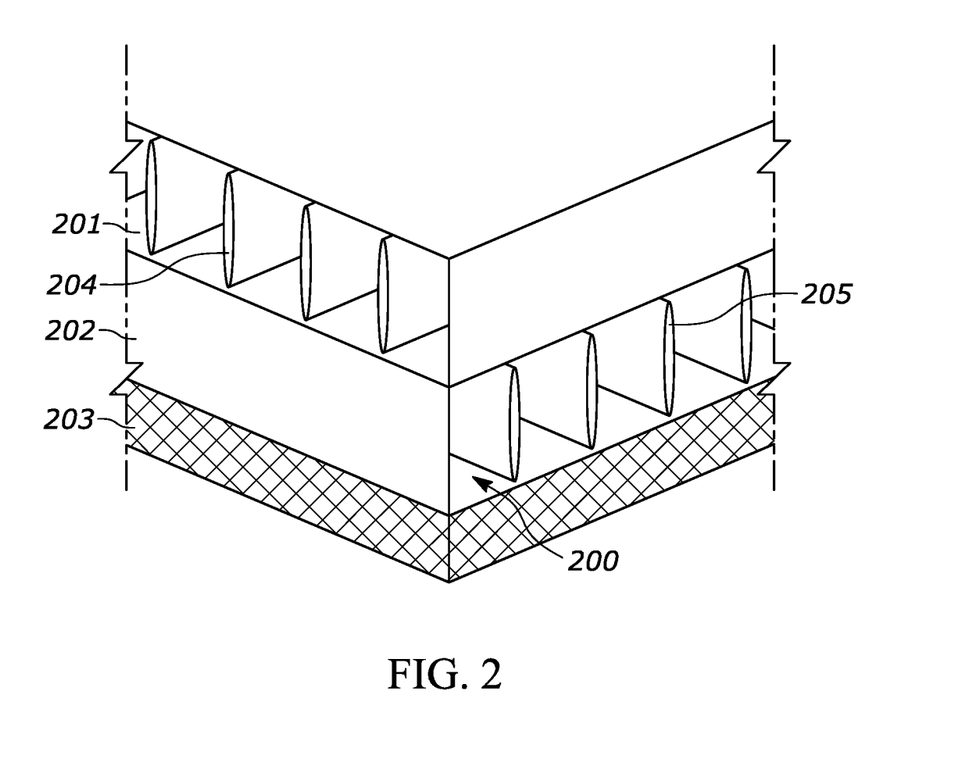
FIG. 2 illustrates a first example embodiment of a blocking assembly with portions cut away.

FIG. 2 illustrates an assembly 200 of elongated flat louvers that blocks light from a device screen 203 that is not traveling nearly parallel to the orientation of the louvers. The angle of column-oriented louvers 204 and the angle of row-oriented louvers 205 in the assembly 200 can be adjusted independently to adjust the direction in which light is allowed to pass through the assembly 200. One or more cameras such as the camera 24 in FIG. 1 can be used to track the orientation of the viewer's eyes to the screen, which can be used to determine the angle that the louvers need to be set to so that the light propagating towards the viewer's eyes is not blocked, but light going in other directions is blocked.

Facial recognition can be used to add additional security by ensure that the face looking at the display is the intended viewer. If someone else looks at the display, then the display can be blacked out by blacking out an LCD panel in front of the display or controlling the display to change the display to just showing black.

Multiple factor authentication (MFA) may be used as an added security measure. Facial recognition can be one of the factors, with other factors including biometrics, location, user behavior, etc.

In some implementations described herein the angle in which light is allowed to pass can be different for different pixels. Such a case can be useful for a large display where the angles from the screen to the viewer's eyes differs for different locations on the screen. This can be accomplished by having the barrier between each opening in the screen be independently movable.

In some implementations, the barriers are aligned with each pixel and are manufactured as part of the screen. In some implementations, the assembly 200 is placed in front of a device screen 103 and the openings between the louvers do not line up with the pixel grid.

In some implementations, the louvers can be built as two or more respective levels or planes 201, 202 that are stacked with each other and can slide in relation to each other. This can be used to control the width of each louver. By making the louvers longer, it narrows the field of view in which light is allowed to pass through. This can be useful in cases where the distance between the viewer's head and the display may vary significantly, widening the field of view when the viewer's head is close so that the field of view includes both of the viewer's eyes, and narrowing the field of view when the viewer's head is far away to prevent light from being emitted at angles that will not be blocked by the viewer's head.

The field of view can be wider than it is tall to cover the area where the viewer's eyes will be in relationship to the screen. This can be accomplished by different length louvers in the column orientation versus the row orientation, which may be accomplished by fixed-width louvers of different lengths, or variable-width louvers set to different widths. This can also be accomplished by having a wider spacing between louvers horizontally than vertically, which will result in a field of view that is wider than it is tall. When used on a screen that may be viewed at different orientations, variable-width louvers can be used to allow the field of view aspect ratio to change when the display orientation is changed in relation to the viewer's eyes.

A privacy screen on a mobile device can allow the active tracking to be turned off to save battery power. The user may also be given the ability to manually control the width of the field of view, so that the user can widen the field of view and turn off the tracking when less stringent security is needed, such as when sitting up against a wall.

With specific regard to FIG. 2, a cross section of a display 203 is shown with an active privacy assembly 200. As mentioned above, stacked layers 201 and 202 each contain movable louvers that can pivot to modify the angle in which the light emitted by the screen can travel. In the example shown, the layers 201, 202 are positioned in front of the screen 203. In some implementations the layers 201, 202 of louvers are manufactured as part of the screen 203, whereas in other implementations the layers 201, 202 are manufactured as a separate unit from the screen 203 and later positioned in relation to the screen. It is to be understood that when a louver is oriented with its plane perpendicular to the display screen, maximum light is passed perpendicularly away from the display screen, while tilting a louver away from being perpendicular to the display screen blocks some light propagating perpendicularly away from the display screen and may act to alter the field of view of light propagating away from the display screen.

The length of the louvers 204 and 205 in the layers 201, 202 controls the width of the field of view of the emitted light. The length of the column-oriented louvers 205 louvers may differ from the length of the row-oriented louvers 204, resulting in the width of the field of view differing between horizontal and vertical spreads.

In some implementations, all of the row-oriented louvers 204 move together to tilt in the same direction, and all of the column-oriented louvers 205 move together to tilt in the same direction. In other implementations, each louver 204, 205 can be moved independently of other louvers.

Figure 2A:
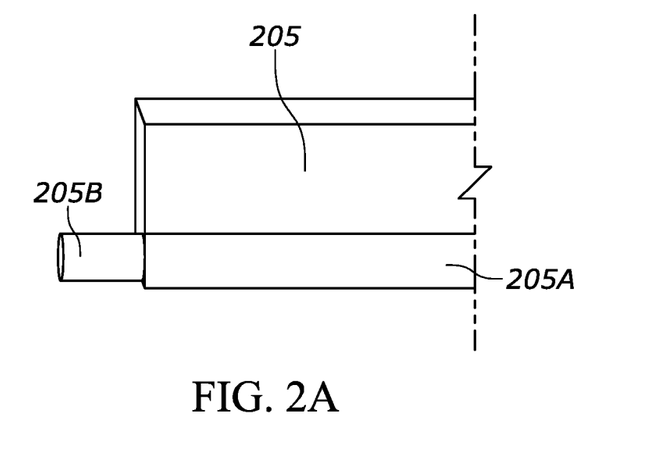
FIG. 2A illustrates an example embodiment of a moving mechanism coupled to a louver of the blocking assembly, with portions of the louver cut away.

FIG. 2A illustrates that a louver such as one of the column-oriented louvers 205 may pivot about a pin 205A coupled to the bottom edge of the louver by a mechanism 205B such as but not limited to a piezoelectric crystal or solenoid. The axis of rotation may be about other portions of the louver, such as the middle of the louver or the top edge of the louver or outside the louver such as below the bottom edge of the louver.

Figure 2B:
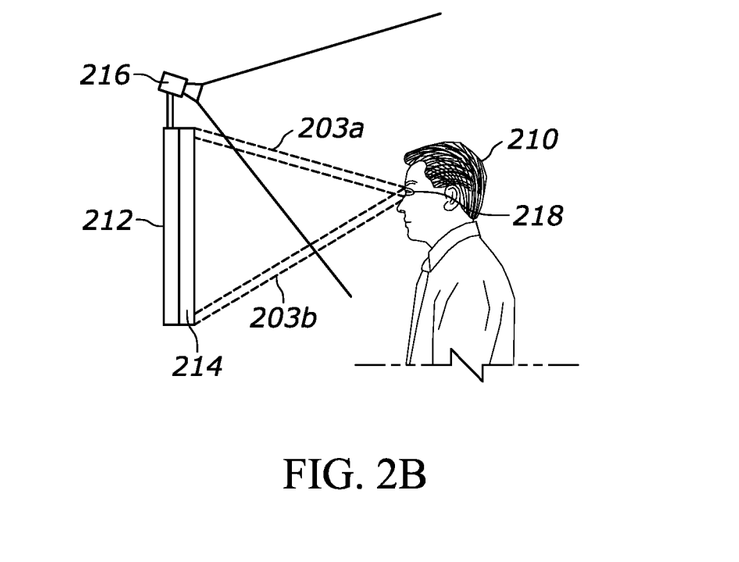
FIG. 2B illustrates a person looking at a device screen.

FIG. 2B shows a side view of a user 210 viewing a display screen 212 with blocking assembly 214. One of more cameras 216 (which may be implemented by the camera 24 in FIG. 1) are used to generate images that the processor 20 executes image recognition on to determine the position of the user's eyes 218 relative to the display 212 based on, e.g., a known location of the camera on the display screen. The user's eye positions are used to move the louvers of the blocking assembly 214 to adjust the direction of emitted light (indicated by beams 203a, 203b) so that the user's eyes 218 are within the field of view of the emitted light. As the user moves his head in relationship to the screen 212, the processor executing image recognition on images from the camera 216 detects the movement of the user's eyes 218 and adjusts the angles of the louvers of the blocking assembly 214 to keep the user's eyes within the field of view of the emitted light.

In some implementations, images from the camera 216 that are used to determine the location of the user's head can also use facial recognition to ensure that the detected user is an authorized user. If more than one user is viewing the screen, facial recognition can determine which, if any, of the users is an authorized user using a database of authorized users, and can adjust the field of view of the emitted light so that only the eyes of the authorized user are within the field of view. If no authorized user is detected, the screen may be turned off so that it emits no light.

In some implementations the louvers located at the outside edges of the display can be tilted in a bit more than louvers crossing the center of the display, resulting in the field of view from the edges of the screen being angled towards the center of the screen, as shown by the fields of view illustrated by the beams 203a, 203b. This advantageously narrows the field of view for a user whose face is close to the display while reducing the ability of an eavesdropper to see the information on the display. This can be accomplished with louvers 204, 205 that all move in unison, or that are independently controlled. With independently controlled louvers 204, 205, the amount that the field of view is adjusted can be modified to compensate for the distance to the user's eyes 218.

Figure 3:
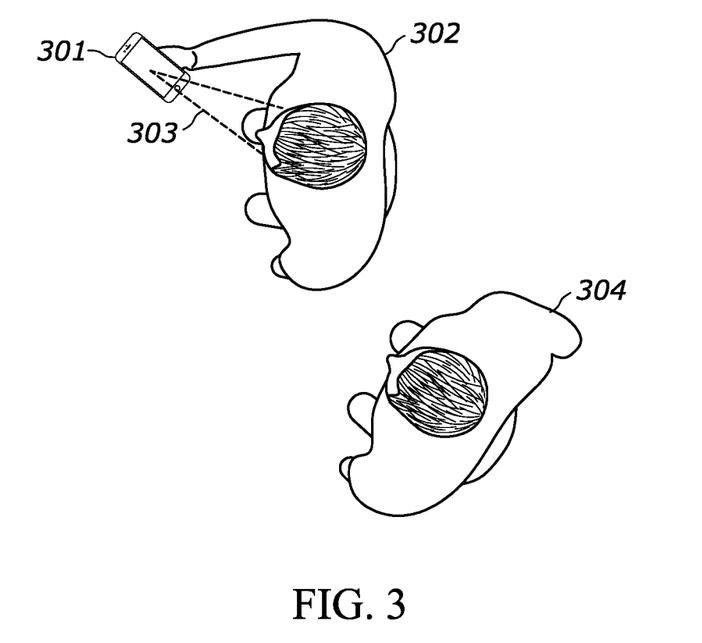
FIG. 3 illustrates two people viewing a device display screen with blocking assembly.

FIG. 3 shows a view of a user 302 viewing a combination display device/blocking assembly 301. An eavesdropper 304 is behind the user 302 looking over the shoulder of the user 302 attempting to view the display screen of the combination display device/blocking assembly 301. However, the eavesdropper 304 cannot see light from the display but can only see a dark screen because the eavesdropper is not in the field of view 303 of the light emitted by the display as established by the louvers of the blocking assembly. In contrast, the user 302 sees the images on the screen of the device 301 normally, as his eyes are within the field of view 303 of the light emitted by the display.

Figure 4:
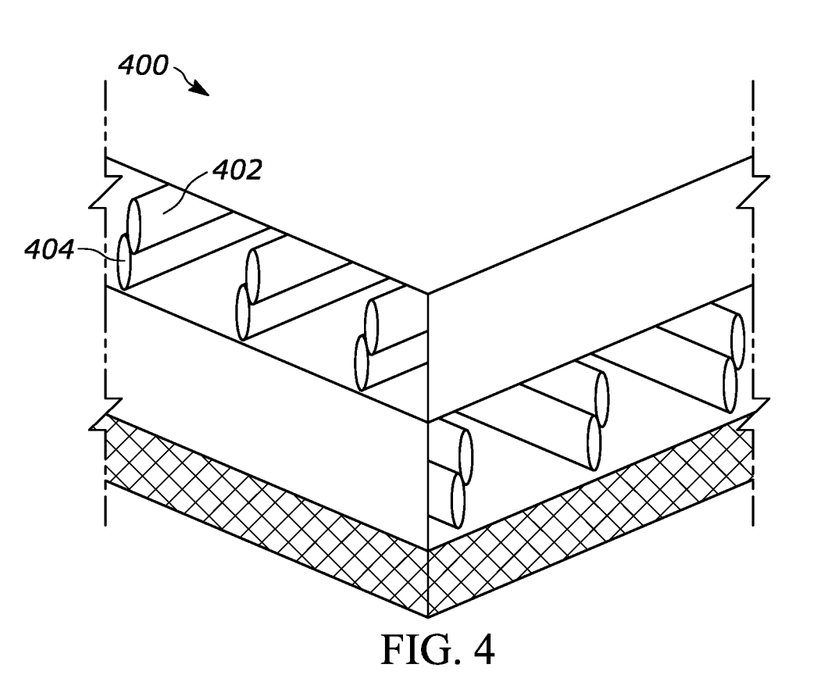
FIG. 4 illustrates a second example embodiment of a blocking assembly with portions cut away.

FIG. 4 illustrates an embodiment substantially identical to that of FIG. 2 with the following exception. Each louver 400 in FIG. 4 includes an upper panel 402 and a lower panel 404 parallel to the upper panel 402. The panels 402, 404 may move in concert with each other or independently of each other. In an example, the one panel 402 can slide longitudinally or transversely relative to the other panel 404 to control the width of the louver 400. This allows the louvers to be lengthened and/or widened to vary the field of view of the emitted light.

Figure 5:
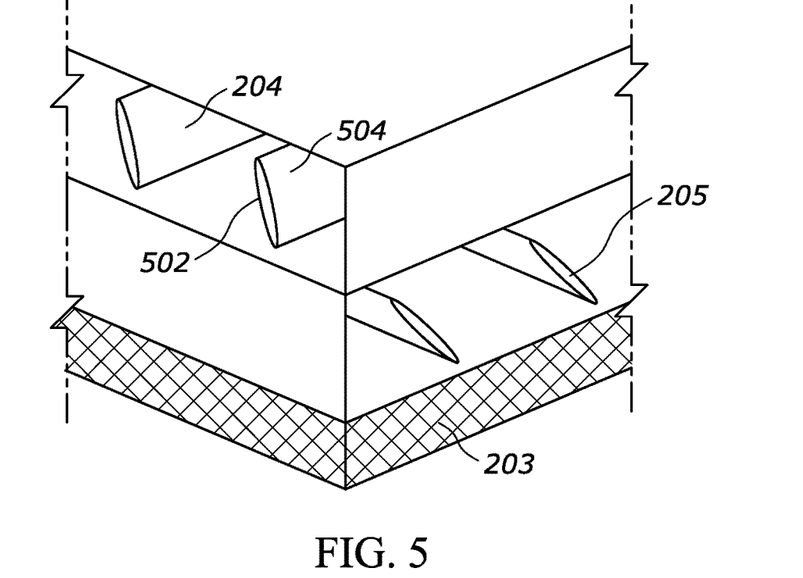
FIG. 5 illustrates a tilted example embodiment of a blocking assembly with portions cut away.

FIG. 5 illustrates the louvers 104, 105 tilted at angles displaced from perpendicular to the display screen 103 so that the field of view of the light that is emitted is not perpendicular to the display screen 103.

Figure 6:
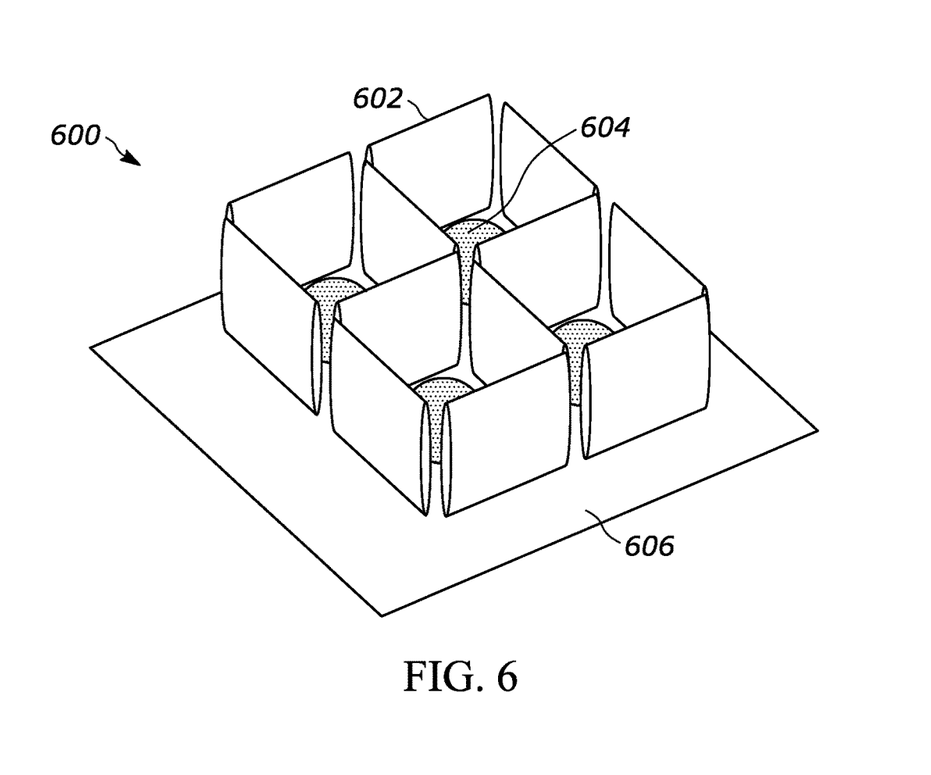
FIG. 6 illustrates another example embodiment of a blocking assembly with portions cut away.

Turning now to FIG. 6, a blocking assembly 600 may include louvers 602 that bound each of the plural (e.g., three or four or other number) edges of each display pixel region 604 of a display 606 (only four-pixel regions 604 shown). Each pixel region 604 may include plural pixels or one and only one single pixel or only a fraction of a light emitting element for a single pixel. The louvers 602 may be built into the display 606 and the louvers 602 may be independently movable from each other.

In some implementations, the louvers between the light emitting elements on some rows are tilted such that only one of the user's eyes is within the field of view of the emitted light, and the louvers between the light emitting elements on other rows are tilted such that only the other of the user's eyes is within the field of view of the emitted light. Such a configuration can be used to display an image in 3D to a user without the need for the user to wear glasses to see the image in 3D by presenting demanded left eye images on, for example, even rows and demanded right eye images on odd rows. Such a configuration can also be used to display an image to more than one user such that no other people viewing the screen around them will see any light emitted by the screen.

In some implementations, the pixels in the regions 604 can be moved up and down in relationship to the louvers 602, 603. When moved forward, less of the louvers are in front of the pixels, and the field of view of the emitted light is wider. Movement of the pixels allows the width of the field of view to be adjusted, which can be used to compensate for different distances between the user and the screen, which in turn can ensure that both of the user's eyes are within the field of view. The field of view, however, does not extend beyond the edges of the user's head to allow light from the display to be visible to someone behind the user.

This can also be used to allow the privacy screen to be turned off by moving the pixels above the louvers until no part of the louvers 602 are in front of the light emitting elements. In some implementations, the pixels may move up and down but the louvers 602 do not move.

Figure 7:
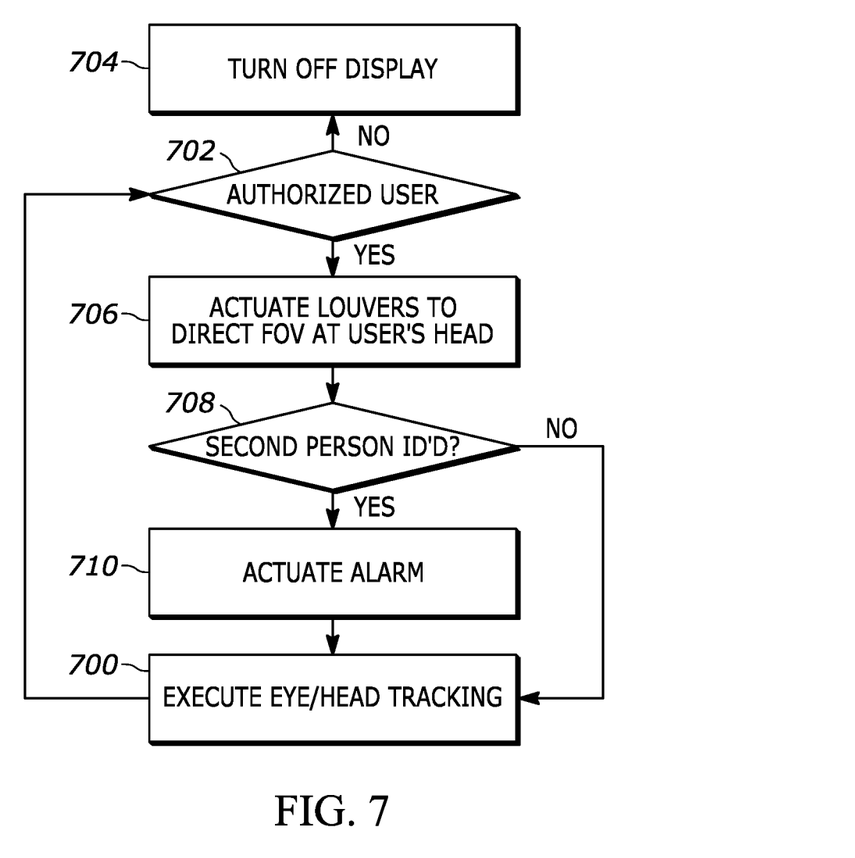
FIG. 7 is a flow chart illustrating logic consistent with present principles.

FIG. 7 illustrates further. Commencing at block 700, the CE device processor accesses images from the camera to execute head and/or eye tracking of the user. The user tracked may be the closest user as indicated by having a largest user image or it may be a user recognized as being authorized. Other heuristics for determining which user to track may apply. Head/eye tracking can lock in on a particular user, such as the user most centered with the display, and that user becomes the target user that the privacy screen limits the field of view to only be seen by that user. As the tracked user moves, the tracking logic follows the user and continues to differentiate the user from other users that may be present.

Moving to decision diamond 702, it may be determined using, e.g., face recognition on the camera images whether the user being tracked at block 700 is an authorized user. If not, the logic may end at state 704 by deenergizing the device display screen.

On the other hand, if the user is an authorized user the logic may move to block 706 to actuate the louvers of any of the blocking assemblies herein to direct the field of view (FOV) of light propagating away from the device display screen at the user, e.g., at the center of the user's head as recognized from block 700.

If desired, the logic may also identify, at decision diamond 708, whether another person in addition to the user appears in the camera images. If so, an audible or visual or tactile alarm may be actuated at block 710 to alert the user that a potential eavesdropper is nearby. The logic in decision diamond 708 may be set so that it only activates the alarm if it determines that the detected another person is within the field of view of the light emitted by the display. In some cases, the alarm may deenergize the screen in addition to alerting the user.

The logic loops back to block 700 to continue tracking the user as shown.

Figure 8:
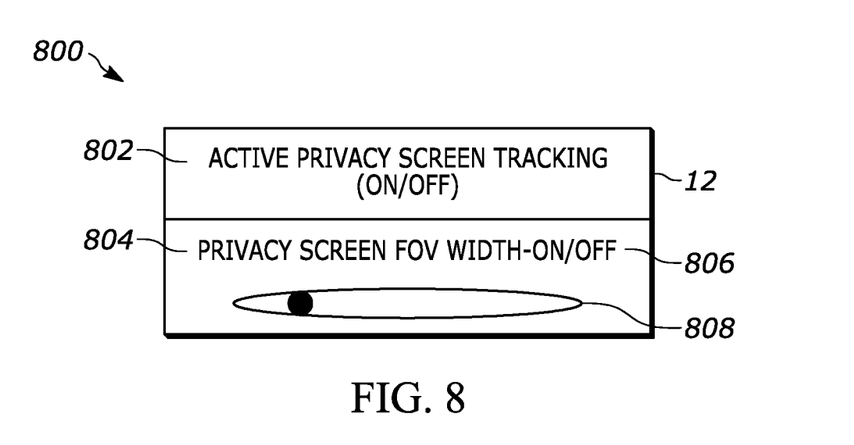
FIG. 8 is a screen shot of an example user interface consistent with present principles.

FIG. 8 illustrates a user interface (UI) 800 that may be presented on the display screen of the CE device to enable a user to select a selector 802 to toggle between enabling and disabling the logic of FIG. 7 and, hence, to enable and disable operation of the blocking assemblies described herein. FIG. 8 can also include a selectable option 804 for "privacy screen field of view width" with an on/off control 806 for "active control" and a slider (or other control) 808 to manually set a level from min to max. Not all UI options may be present in every implementation. There can also be a privacy screen on/off control.

Thus, light from a display screen coupled to a blocking assembly herein is emitted in different directions in response to a user moving his head in relationship to the display screen so that the user's eyes are always within the field of view of the light emitted by the display.

Figure 9:
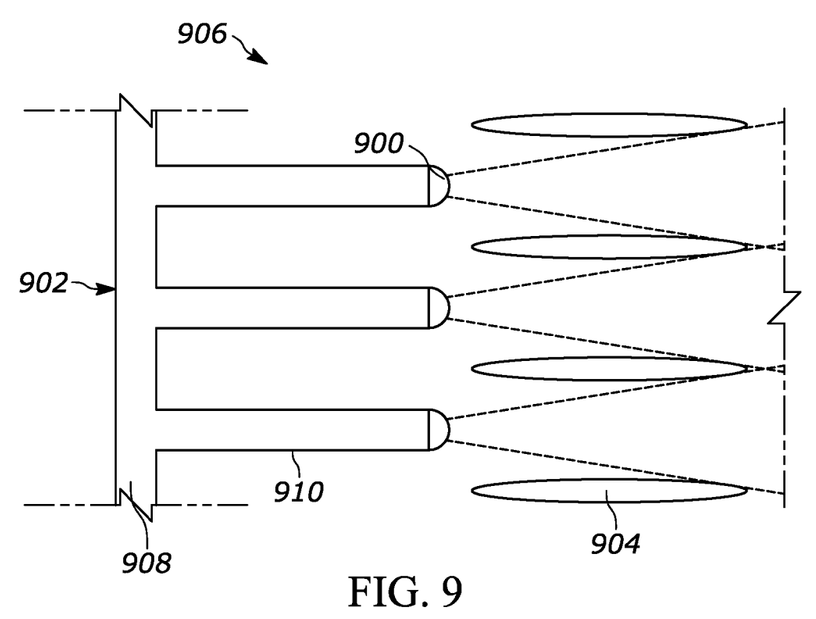
FIGS. 9 and 10 illustrate an embodiment with movable light emitting elements.
Figure 10:
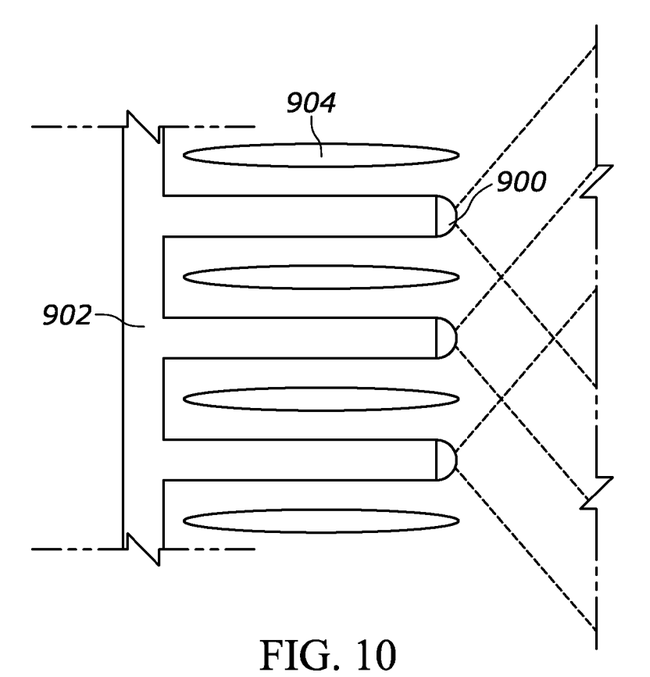

FIGS. 9 and 10 show an implementation in which light emitting elements 900 of a device display 902 can be moved in relationship to louvers 904 of a privacy screen 906. FIG. 9 shows the light emitting elements 900 retracted to minimize the field of view of the light emitted by the screen. FIG. 10 shows the light emitting elements 900 advanced beyond the louvers 904, effectively turning off the privacy screen. The field of view of the light emitted by the screen in FIG. 10 is maximized and is the same as it would be if the device screen 902 did not employ a privacy screen 906.

The louvers 904 of the privacy screen restrict the field of view of the emitted light when the light emitting elements 900 are not advanced beyond of the louvers. The light emitting elements 900 may be mounted on a backing 908 that has stalks 910 on the ends of which the light emitting elements 900 may be mounted, such that the light emitting elements 900 are advanced beyond louvers 904 when the backing 908 is moved forward.

In some implementations, the louvers 904 are in a fixed position. In some implementations, the louvers 904 are movable to modify the angle in which light is emitted.

In some implementations, the light emitting elements 900 can be pushed forward to one or more intermediate positions between fully retracted and fully extended. In such an implementation the field of view can be variable. Such an implementation allows the user to adjust the field of view of the light emitted by their display as easily as they adjust the brightness of the display and allows the field of view to be dynamically adjusted.

In some implementations, the movements of the viewer's head are monitored and the field of view of the screen is adjusted to be viewable within the range that the viewer normally moves his head, but not viewable in angles beyond that. This allows the user to continue his normal movements without seeing the image fade for some head positions without the need to move the louvers. The monitoring can further detect other faces to ensure that no other face is within the field of view of the screen. The field of view can temporarily be narrowed, or the screen can be turned off to prevent others from seeing what is being displayed. Such an implementation can allow fixed louvers to be used, where the angle of the field of view is actively adjusted. Such an implementation can be used with movable louvers to save power usage by widening the field of view enough that the louvers do not need to be moved for every little movement of the user's head to prevent the user from seeing the image fade in some head positions.

In some implementations, light emitting elements 900 may be pushed forward independent of the position of other light emitting elements, either individually or in groups.

It will be appreciated that whilst present principals have been described with reference to some example embodiments, these are not intended to be limiting, and that various alternative arrangements may be used to implement the subject matter claimed herein.

What is claimed is:

1. An apparatus comprising:
    at least one device screen; and
    at least one blocking assembly comprising first and second sets of louvers and being juxtaposed with the screen, the louvers configured to move to at least partially restrict light propagation, wherein at least one of the louvers comprises an upper panel and a lower panel parallel to the upper panel and slidably movable relative thereto.

2. The apparatus of claim 1, wherein the first set of the louvers is oriented perpendicular to the second set of the louvers.

3. The apparatus of claim 1, wherein at least one of the louvers is configured to tilt about an edge of the louver.

4. The apparatus of claim 1, wherein at least one of the louvers is positioned in front of the device screen.

5. The apparatus of claim 1, wherein at least one of the louvers is manufactured as part of the device screen.

6. The apparatus of claim 1, wherein louvers in the first set of louvers have a first length and louvers in the second set of louvers have a second length different from the first length.

7. The apparatus of claim 1, wherein at least some of the louvers move in concert with each other.

8. The apparatus of claim 1, wherein at least some of the louvers move independently of each other.

9. The apparatus of claim 1, wherein the first set of louvers is disposed in a first level a first distance from the device screen and the second set of louvers is disposed in a second level a second distance from the device screen.

10. A consumer electronics (CE) device, comprising:
    at least one display screen; and
    at least one louver assembly juxtaposed with the display screen and comprising louvers that bound each of plural edges of at least a first pixel region of the display screen containing a first pixel, at least the first pixel of the first pixel region being movable relative to the louvers, or the louvers being movable relative to the first pixel, or both the first pixel and louvers being movable, wherein the first pixel of the first pixel region is movable relative to the louvers.

11. The CE device of claim 10, wherein the louvers are movable relative to the first pixel.

12. The CE device of claim 10, wherein both the first pixel and louvers are movable.

* * * * *